United States Patent [19]
Hisano

[11] Patent Number: 5,179,625
[45] Date of Patent: Jan. 12, 1993

[54] FUZZY INFERENCE SYSTEM HAVING A DOMINANT RULE DETECTION UNIT

[75] Inventor: Atsushi Hisano, Nagaokakyo, Japan

[73] Assignee: Omron Tateisi Electronics Co., Kyoto, Japan

[21] Appl. No.: 880,487

[22] Filed: May 5, 1992

Related U.S. Application Data

[63] Continuation of Ser. No. 412,014, Sep. 25, 1989, abandoned.

[30] Foreign Application Priority Data

Sep. 26, 1988 [JP] Japan .................................. 63-240374
Sep. 30, 1988 [JP] Japan .................................. 63-248665
Sep. 30, 1988 [JP] Japan .................................. 63-248666
Sep. 30, 1988 [JP] Japan .................................. 63-248667

[51] Int. Cl.[5] ............................................. G05B 11/01
[52] U.S. Cl. ......................................... 395/3; 395/11; 395/51; 395/61; 395/900
[58] Field of Search ..................... 395/3, 11, 61, 900, 395/51

[56] References Cited

PUBLICATIONS

King, P. J. and Mamdani, E. H., "The Application of Fuzzy Control Systems to Industrial Processes", *Automatica*, vol. 13, pp. 235-242, 1977.

Yamakawa, Takeshi, "An Approach to a Fuzzy Computer Hardware System", *Proc. 2nd Int. Conf. on Artificial Intelligence*, Marseilles, France, Dec. 1-5, 1986.

*Primary Examiner*—Allen R. MacDonald
*Attorney, Agent, or Firm*—Dickstein, Shapiro & Morin

[57] ABSTRACT

A fuzzy inference system includes a rule processing means for receiving an input signal and inferencing the input signal in accordance with a plurality of fuzzy rules to generate inferenced data (B1, B2, B3, A1, A2, A3), a defuzzify means (19, 20, 119, 120, M1, 201, 203) for synthesizing and defuzzifying the inferenced data to generate a decided value (eO), and a dominant rule means (21, 121, 210) receiving the inferenced data and decided value for finding a dominant rule of the plurality of fuzzy rules which has the largest contribution degree to the decided value.

10 Claims, 13 Drawing Sheets

→ K1

+

→ K2

+

→ K3

⇓

FUZZY INFERENCE SYSTEM HAVING A DOMINANT RULE DETECTION UNIT

This application is a continuation of application Ser. No. 07/412,014, filed Sep. 25, 1989, now abandoned.

BACKGROUND OF THE INVENTION

1. Field of the Invention

This invention relates to a fuzzy inference system, and more particularly to an improved fuzzy inference system having a rule processing means for inferencing an input and a defuzzify means for generating a decided value.

2. Discussion of the Related Art

There is well known a fuzzy inference system including a plurality of fuzzy rules each having an antecedent (1F~) and a consequent (THEN~) wherein the rules are made based on experimental data and stored therein for fuzzy inference. It is found, however, that important rules are mixed with unnecessary rules or lengthy rules in such stored rules when an input signal has been inferenced in accordance with the stored rules. Such unnecessary rules consume unnecessary circuits if the fuzzy inference system is constructed with hardware components or complicated time-consuming programs if it is constructed with programs in a computer. Accordingly, the conventional fuzzy inference system has the disadvantages that it is very troublesome to store the best fuzzy rules excluding improper rules in the fuzzy inference system as various input signals are inferenced.

SUMMARY OF THE INVENTION

It is, therefore, a primary object of this invention to provide a fuzzy inference system including a plurality of fuzzy rules and a means for finding a dominant rule having the largest contribution to an inference result by the system so that the best fuzzy rules can be easily set.

It is a further object of this invention to provide a fuzzy inference system having a rule evaluation means for evaluating the dominant rule about its fitness.

It is a still further object of this invention to provide a fuzzy inference system having a proposition evaluation means for evaluating the best proposition about the dominant rule.

It is another object of this invention to provide a fuzzy inference system including means for synthesizing the results of fuzzy inference by a plurality of fuzzy rules by variable ratio according to a dominant rule.

According to this invention there is provided a fuzzy inference system including rule processing means for receiving an input signal and inferencing the input signal in accordance with a plurality of fuzzy rules to generate inferenced data (B1, B2, B3, A1, A2, A3), defuzzify means (19, 20, 119, 120, M1, 201, 203) for synthesizing and defuzzifying the inferenced data to generate a decided value (e0), and dominant rule means (21, 121, 210) receiving the inferenced data and decided value for finding a dominant rule of the plurality of fuzzy rules which has the largest contribution degree to the decided value.

BRIEF DESCRIPTION OF THE DRAWINGS

The above and other objects, advantages and features of this invention will be more fully understood from the following detailed description of the invention which is provided in conjunction with the following drawings, of which.

DETAILED DESCRIPTION OF THE INVENTION

Figure 1:
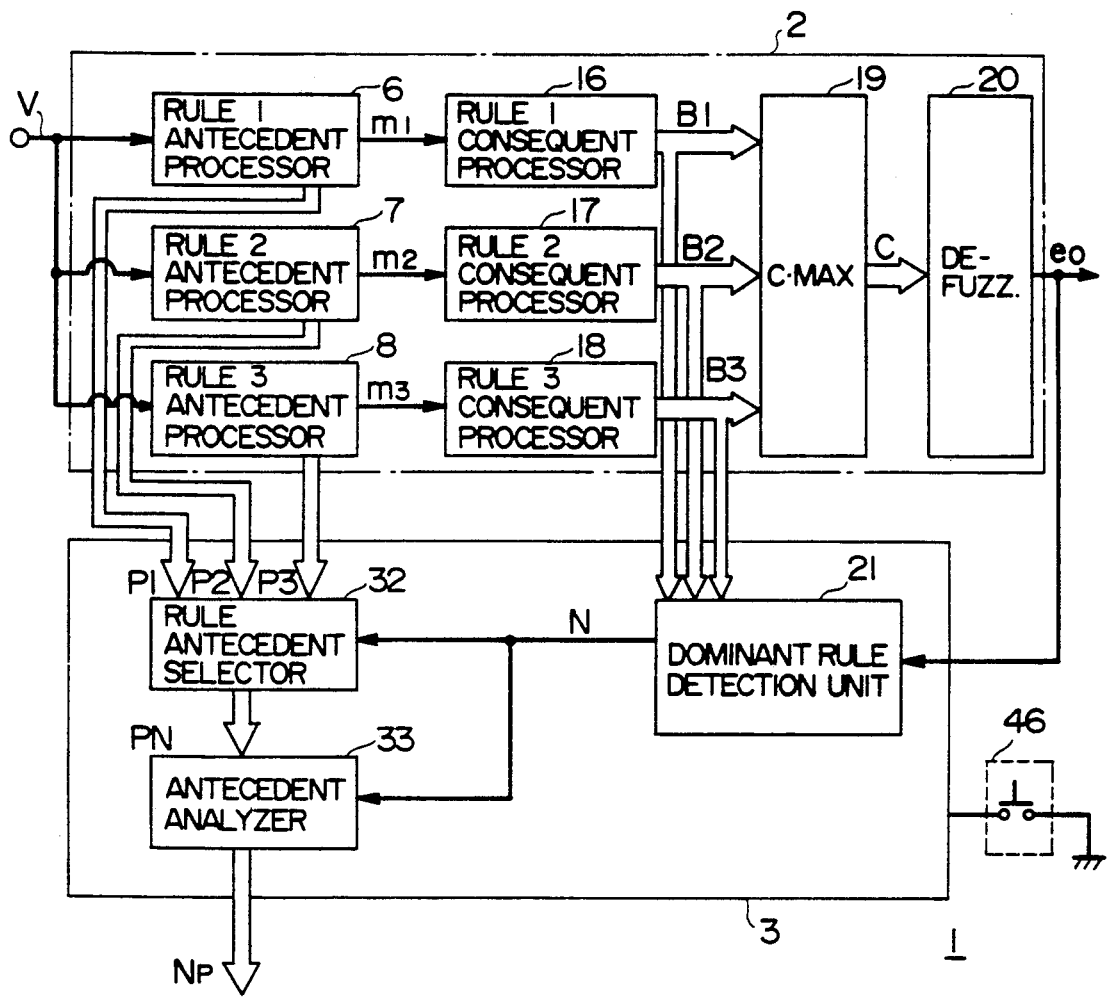
FIG. 1 is a schematic block diagram of first embodiment of a fuzzy inference system according to this invention.

Referring to FIG. 1, there is shown a fuzzy inference system 1 as a first embodiment according to this invention, which includes a fuzzy inference implementation section 2 and a dominant rule and proposition detection section 3.

The fuzzy inference section 2 is composed of a computer having a program or a hardware component, which infers a fuzzy input V and generates a defuzzified output or a decided value e0. The fuzzy input V is applied from a sensor unit (not shown in drawings) to sense a status of an object to be controlled by this fuzzy inference control system 1 regarding positions, angles, speed, and so on, and herein consists of three input variables V1, V2 and V3. The defuzzified output e0 is applied to an actuator (not shown in drawings) which drives the object in a desired status. If desired as another application of this system 1, the input V may be any other data to be processed by this system, and the defuzzified output e0 may be applied to any other components for further processing.

Figure 2:
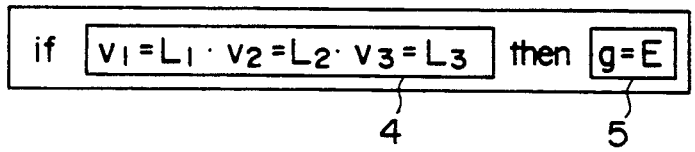
FIG. 2 illustrates an example of a rule employed in the fuzzy inference system of FIG. 1.

In the fuzzy inference section 2, a plurality of fuzzy rules expressed in a production rule style are stored, and each rule consists of an antecedent 4 and a consequent 5 as shown in FIG. 2 which implies "if the input variable V1 is L1, the input variable V2 is L2 and the input variable V3 is L3, then the output variable g is E". The respective propositions "V1=L1", "V2=L2" and "V3=L3" have membership values as their proposition values which imply the grades of variables V1, V2 and V3 belonging to fuzzy labels L1, L2 and L3.

Assuming that the fuzzy inference section 2 is fed with the input variables V1, V2 and V3, the operation by the section will be described hereinafter. The input variables V1, V2 and V3 are applied to antecedent processors 6, 7 and 8, but by way of example, the operation in the rule 1 antecedent Processor 6 will be explained in conjunction to FIG. 3.

Figure 3:
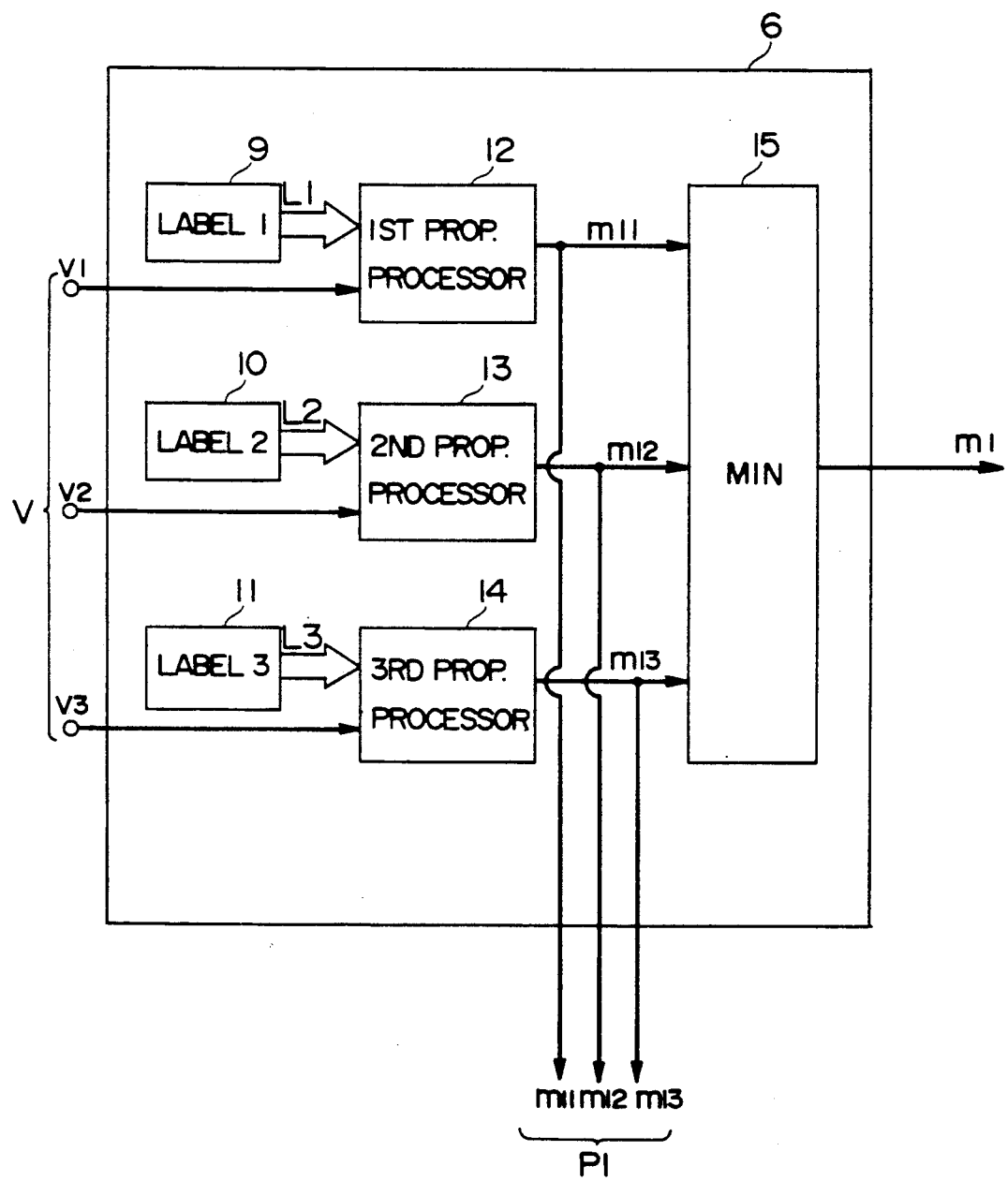
FIG. 3 is a schematic block diagram of a rule-1 antecedent processor employed in the fuzzy inference system.

In FIG. 3, the input variables V1, V2 and V3 are respectively applied to first, second and third proposition processors 12, 13 and 14 together with outputs from circuits 9, 10 and 11 generating input membership functions, and are processed by the processors 12, 13 and 14 to be converted into membership values (grades) m11, m12 and m13 which are expressed as $$m11 = \mu L1(V1) \qquad (1)$$

$$m12 = \mu L2(V2) \qquad (2)$$

$$m13 = \mu L3(V3) \qquad (3)$$

Thus processed membership values m11, m12 and m13 are applied to a MIN circuit 15 wherein the minimum value thereamong is found as the processed result m1 in the antecedent processor 6, and the minimum membership value m1 is applied to a rule 1 consequent processor 16 of FIG. 1.

In the processor 16, the outputted membership function generally expressed by triangle or trapezoid is truncated in accordance with the grade of the received minimum value m1, that is, a truncating operation is performed. The result B1 of the truncating operation is applied to a C·MAX (corresponding MAX) circuit 19.

Thus, the evaluation of the input V or the input variables V1, V2 and V3 is performed under the rule 1. In parallel, the evaluation under a rule 2 and a rule 3 is performed by the rule 2 and rule 3 antecedent processors 7 and 8 and by the rule 2 and rule 3 consequent processors 17 and 18 in the same manner as the rule 1. The respective process results B1, B2 and B3 are applied to the CMAX circuit 19 for synthesis. The process results B1, B2 and B3 are represented by (n+1) number of distributed signals from 0 to n as explained later.

Figure 4:
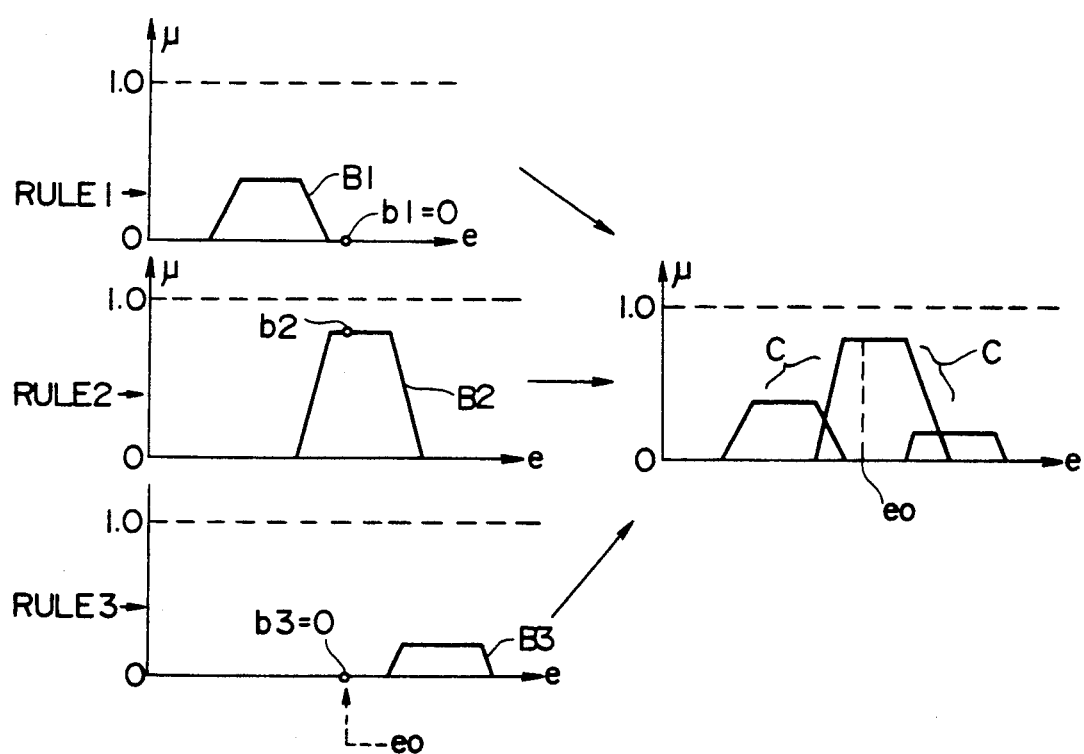
FIG. 4 illustrates a MAX operation implemented in the fuzzy inference system.

Referring to FIG. 4, the MAX operation for synthesizing process results by the three rules in the CMAX circuit 19 is illustrated. The process results B1, B2 and B3 are generally expressed by trapezoid functions since they are already truncated by the consequent processors 16, 17 and 18, and synthesized to a function C having a common abscissa e. The function C is a result of synthesizing the results B1, B2 and B3 under the rules 1 through 3, and implies the inference result by the fuzzy inference implementation section 2.

The inference result is converted into a decided value by a defuzzifier 20 of FIG. 1. Usually, the defuzzifying operation is performed by finding the weighted center in the above-mentioned function or waveform C. Accordingly, if the inference result C is defuzzified by a conventional weighted vote method, the decided value e0 is found as a defuzzified output as shown in FIG. 4. The decided value e0 is applied to the external actuator through an interface for controlling the object to be controlled thereby, or to other components, if desired.

Referring back to FIG. 1, the operation in the dominant proposition detection section 3 for finding which rule and which proposition of its antecedent play a bigger role in the fuzzy inference result shown in FIG. 4 will be discussed hereinafter.

Figure 6:
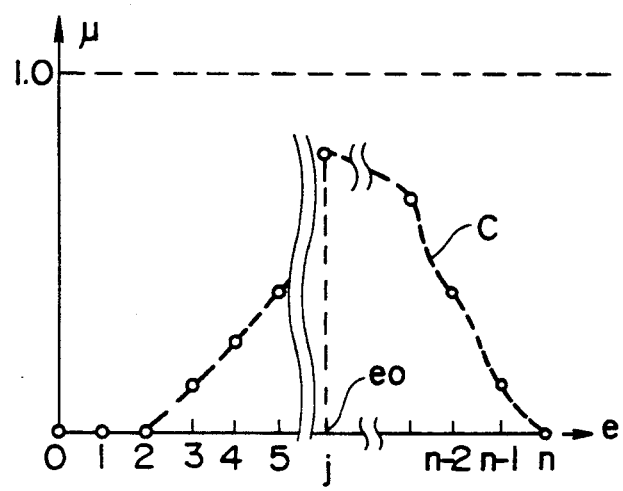
FIG. 6 illustrates an example of an inference result by the fuzzy inference system.

Prior to finding the dominant proposition, the dominant rule must be found. The dominant proposition detection section 3 includes a dominant rule detection unit 21 for finding which rule is dominant among the rules 1 through 3 to contribute the decided value. Though the function or waveform C representing the inference result show a continuous function, it is not always necessary to be continuous. Accordingly, the function C in this embodiment is represented by (n+1) number of distributed values at the abscissa e (0 to n) representing the fuzzy output which is divided into n sections as illustrated in FIG. 6.

Figure 5:
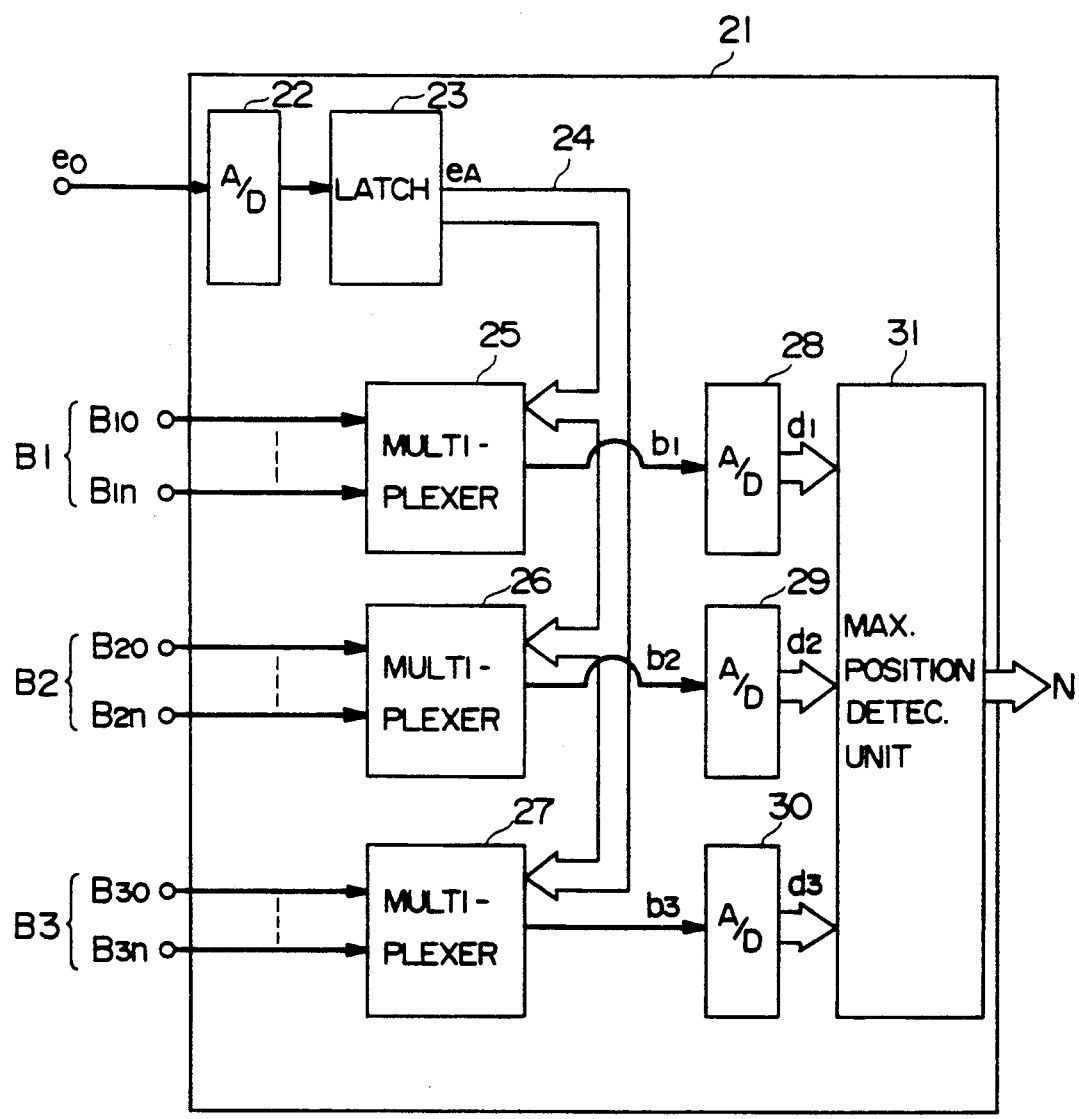
FIG. 5 is a schematic block diagram of a dominant rule detection unit employed in the fuzzy inference system.

In FIG. 5, there is shown a construction of the dominant rule detection unit 21 which receives the decided value e0 from the defuzzifier 20. The value e0 is applied to a latch circuit 23 through an A/D converter 22 to generate an output eA representing the magnitude in the abscissa of the decided value e0 or in FIG. 6 one value (e.g. j) in the sections 0 to n.

The latch output eA is applied as a select signal to three analog multiplexers 25, 26 and 27 through a bus 24. The respective multiplexers 25, 26 and 27 receive the process results B1, B2 and B3 as their selected signals from the consequent processors 16, 17 and 18 (FIG. 1). Each of the process results B1, B2 and B3 also is represented by (n+1) number of distributed values at 0 to n like the function C shown is FIG. 6. As a result, the multiplexers 25, 26 and 27 generate values b1, b2 and b3 in the functions B1, B2 and B3 corresponding to the decided value e0, wherein in case of FIG. 4 b1=0 and b3=0. These analog outputs b1, b2 and b3 are converted by A/D converters 28, 29 and 30 into digital signals d1, d2 and d3 for application to a maximum position detection unit 31 which finds the largest one among the outputs d1, d2 and d3 and selects the number N of the rule providing the largest output, e.g. the rule 2 in FIG. 4. The dominant rule number N is decided by the following equations:

$$N = \begin{cases} 1 : d1 \geq \max(d2, d3) \\ 2 : d2 > \max(d1, d3) \\ 3 : d3 > \max(d1, d2) \end{cases}$$

Thus, the dominant rule detection unit 21 finds the dominant rule having the largest contribution degree to produce the decided value e0 by finding what are the outputs B1, B2 and B3 under the rules 1 to 3 corresponding to the value e0. Since generally the (output) membership functions are represented by generally simple and convex functions such as triangular or trapizoid, the dominant rule can be found with a high accuracy by the above-mentioned operation.

In FIG. 1 the rule number N of the dominant rule thus found in the dominant rule detection unit 21 is applied to a rule antecedent selector 32 and an antecedent analyzer 33, in which the most dominant proposition is found in the dominant rule N. As described above with reference to FIG. 3, the respective input variables v1, v2 and v3 of the input V are evaluated by the antecedent processors 6, 7 and 8 to generate the membership values. The membership value produced in the rule 1 antecedent processor 6 is a group P1 of the membership values m11, m12 and m13. The other antecedent processors 7 and 8 also generate membership values P2 (m21, m22 and m23) and P3 (m31, m32 and m33). The membership values P1, P2 and P3 are applied to the rule antecedent selector 32. If the number N of the dominant rule is applied to the selector 32, the selector produces the membership value PN (mN1, mN2 and mN3) regarding the rule N providing the dominant rule. By way of example, in the status shown in FIG. 4 wherein the dominant rule is the rule 2 (N=2), the membership value P2 (m21, m22 and m23) is applied to the antecedent analyzer 33.

Figure 7:
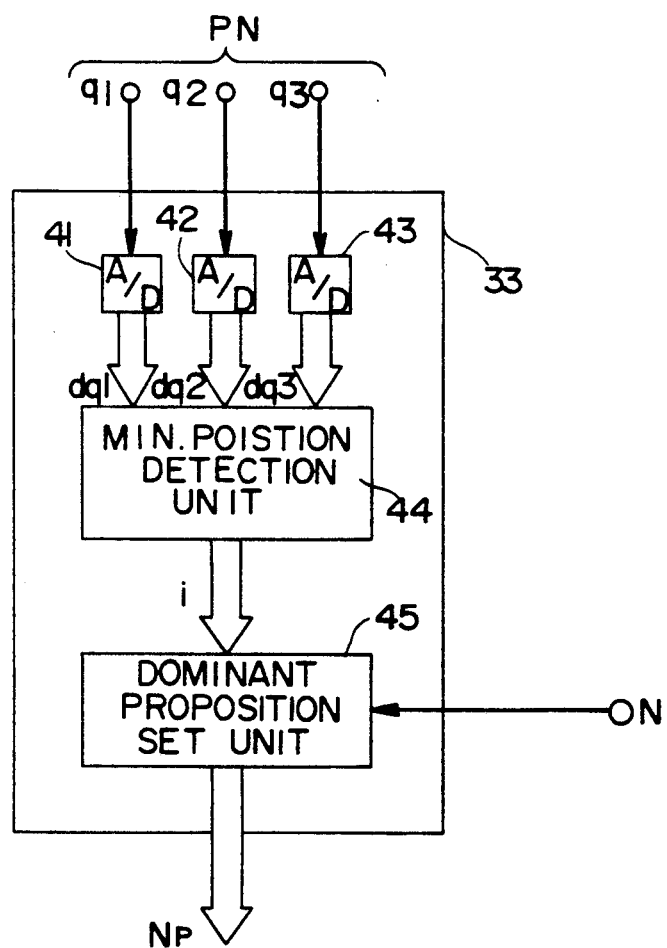
FIG. 7 is a schematic block diagram of a antecedent analyzer employed in the fuzzy inference system.

For the sake of simplicity, the selected output PN (mN1, mN2 and mN3) from the selector 32 is represented by outputs (q1, q2 and q3). In FIG. 7, there is shown a construction of the antecedent analyzer 33 receiving the outputs q1, q2 and q3. The outputs are converted by A/D converters 41, 42 and 43 to produce digital values dq1, dq2 and dq3 for application to a minimum position detection unit 44 which finds the minimum value dqi among the digital values dq1, dq2 and dq3 and determines the proposition number i. The proposition designated by "i" is the dominant proposition. Since the minimum values obtained by the MIN operation in the antecedent processors are applied to the consequent processors as the values representing the antecedent operations in this embodiment, the proposition providing the minimum value is regarded as the dominant rule in this antecedent analyzer 33.

The "i" thus obtained in the minimum position detection unit 44 is applied to a dominant proposition ID set unit 45 fed with the number N of the dominant rule. The unit 45 generates an output NP (N, i).

The output NP (N, i) implies that the rule "N" and the proposition "i" in the rule has the greatest contribution to produce a decided value, and may be displayed to an operator through a display (not shown in drawings). Thus, the operator can confirm to make a better fuzzy rule by fine tuning the dominant rule and the its dominant proposition when the current inference seems to be good. When the current inference seems to be bad, the operator can minimize the affection by the improper fuzzy rule by rewriting or deleting the dominant rule and proposition.

It is effective in the fuzzy inference to obtain an aim for deleting such improper rules.

A push button switch 46 of FIG. 1 is provided for starting the above detection about the dominant rule and proposition in this system. Upon the actuation of the switch 46, the latch circuit 23 in the dominant rule detection unit 21 (FIG. 5) is triggered to execute the above-described operations. The operator can detect the dominant rule and proposition at any operator's desired timing to control the object.

Instead of the switch 46, the latch circuit 23 may be cyclically triggered for a predetermined period so that the results of the detection for dominant rules and propositions can be stored in a time sequence, whereby the effectiveness and invalidity of rules can be more accurately analyzed.

Figure 8:
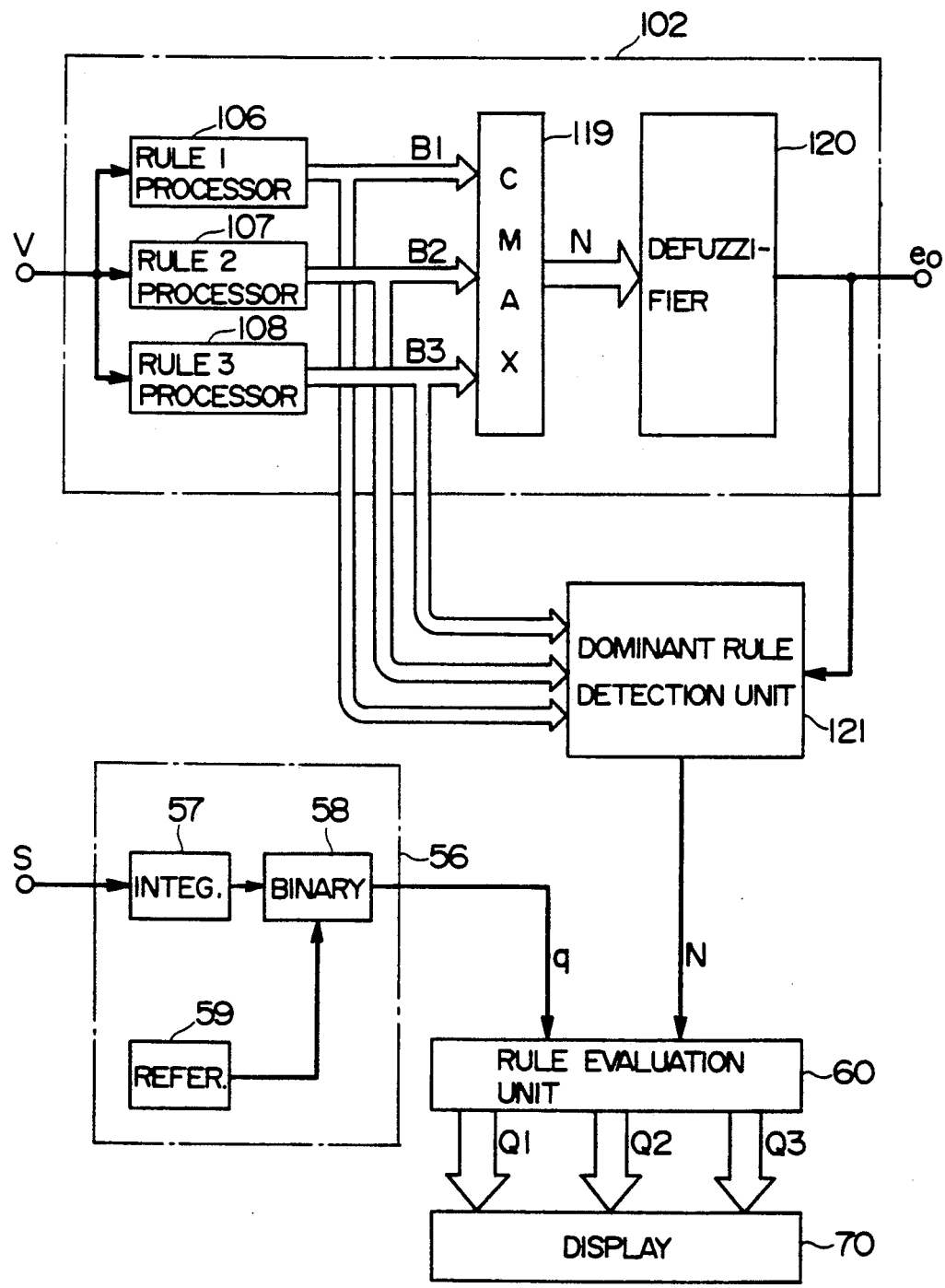
FIG. 8 is a schematic block diagram of a modification of the fuzzy inference system of FIG. 1.

Referring to FIG. 8, there is shown a modified embodiment of the fuzzy inference system 1 shown in FIG. 1. This modified system is further provided with a rule evaluation means for evaluating the dominant rules. The system of FIG. 1 includes a fuzzy inference section 102 and a dominant rule detection unit 121.

The fuzzy inference section 102 has the same construction and function as that of the section 2 of FIG. 1. Rule 1, rule 2 and rule 3 processors 106, 107 and 108 receiving status signals V correspond to the rule 1 antecedent and consequent processors 6 and 16, the rule 2 processors 7 and 17, and the rule 3 processors 8 and 18, whereby process results B1, B2 and B3 are generated. The results or membership functions B1, B2 and B3 are applied through a C-MAX 119 (corresponding to 19 of FIG. 1) to a defuzzifier 120 (corresponding to 20 of FIG. 1) to generate a decided value e0 to be applied to an external actuator or driver actuating an object to be controlled. The dominant rule detection unit 121 corresponds to the unit 21 of FIG. 1 as a dominant rule means, and receives the results B1, B2 and B3 and the decided value e0 from the section 102. The detection unit 121 generates a dominant rule number N in the same manner as described referring to FIG. 5.

The dominant rule number is given to a rule evaluation unit 60 connected with a control result evaluation unit 56 having an integration circuit 57, a binary code circuit 58 and a reference value circuit 59. The unit 56 receives a deviation signal 5 representing an absolute value of a difference between a command and a status of the object. The deviation signal S is integrated by the integration circuit 57 to be applied to the circuit 58. The binary code circuit 58 compares the integrated value from the circuit 57 with a reference value produced by the reference value circuit 59 to produce a binary signal q to be applied to the unit 60. The control is regarded as good when the signal q is in a low level "L", and as bad when the signal is in a high level "H".

Figure 9:
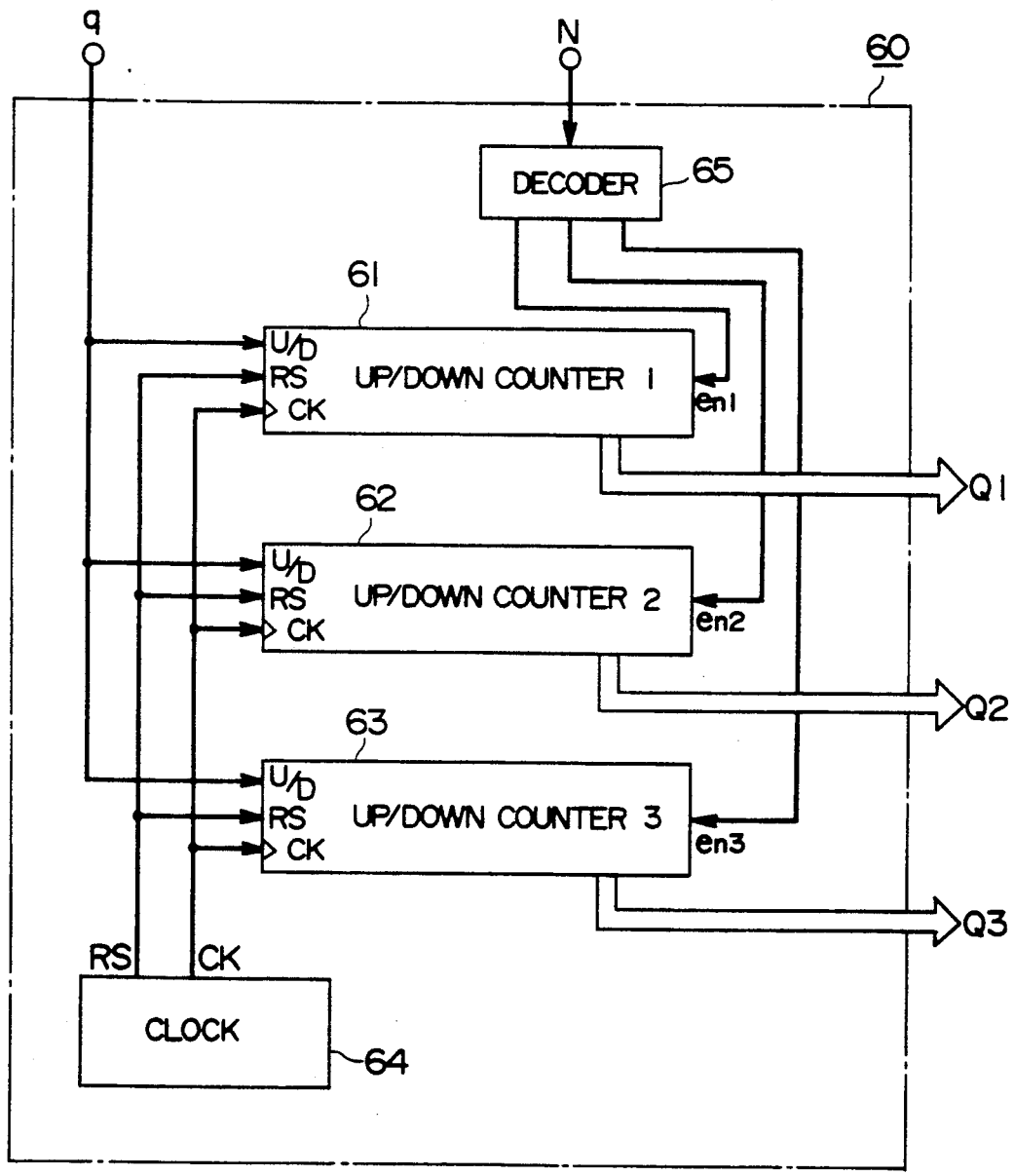
FIG. 9 is a schematic block diagram of a rule evaluation unit employed in the modified fuzzy inference system of FIG. 8.

FIG. 9 shows a construction of the rule evaluation unit 60 receiving the binary signal q and the dominant rule number N. A decoder 65 receiving the dominant rule number N has three output en1, en2, and en3. If N=1, then en1=H, en2=L, and en3=L. If N=2, then en1=L, en2=H, and en3=L. If N=3, then en1=L, en2=L, and en3=H. The outputs en1, en2 and en3 play enable signals driving UP/DOWN counters 61, 62, and 63.

The counters 61, 62 and 63 respectively produce evaluation values about rule 1, rule 2 and rule 3, and are fed with the binary signal, viz., control result evaluation value q. The signal q designates the direction of count in the counters. That is, if q="L" (control result is good), the counters serve as UP counters. If q="H" (control result is bad), the counters serve as DOWN counters. The respective counters are further provided with a clock pulse CK and a reset pulse RS from a clock generator 64. The reset pulse RS is given to the counters 61, 62 and 63 in a predetermined cycle to prevent overflowing in digits thereof.

Assuming q="L" and N="1" as a result of a fuzzy inference at a time point, the counters 31, 32 and 33 become UP counter. However, only the enable signal en1 is "H" because of N=1, and only the counter 61 counts UP the evaluation value about rule 1 for each clock pulse CK from the clock generator 64, while other counters 62 and 63 remain to hold their previous evaluation values. If q becomes "H" and N becomes "2" as a result of fuzzy inference at the subsequent time point, all counters 61 and 63 become DOWN counters. The counter 62 counts down its evaluation value about the rule 2 for each clock pulse CK, but other counters 61 and 63 does not count. If q="H" and N=1, the counter 61 counts down the evaluation value about the rule 1.

Thus, the respective counters 61, 62 and 63 generate the evaluation values Q1, Q2 and Q3 about rules (1, 2 and 3) based on the evaluation value q of the control result and the dominant rule number N. The evaluation values Q1, Q2 and Q3 are applied to a display 70 wherein the respective evaluation values of the dominant rules are indicated by digital numbers. Thus, the operator can easily find the grade of fitness about each rule.

Though the input of the control result evaluation unit 56 in this modified embodiment is the deviation signal S, it may be time factor or others if desired.

The evaluation value of the control result may be modified to be multistage, such as "good", "a little good", "ordinal", "a little bad", "bad", and so on. For this purpose, the clock generator 64 should be controlled to generate variable pulse rate signals according to the value q. The display 70 may be designed to display the maximum or minimum value among the values Q1, Q2 and Q3, or to display the values Q1, Q2 and Q3 in the order of largest value. The display 70 further may be a printer, if desired.

According to this modified embodiment, the rule evaluation is based on a result of controlling the object by the decided value, so that the rule having a good contribution to the control is given a good evaluation even if the fitness of its membership function is small. On the other hand, the rule having a bad affection to the control is given a bad evaluation even if the fitness of its membership function is large. Thus, each rule is easily and correctly evaluated.

Figure 10:
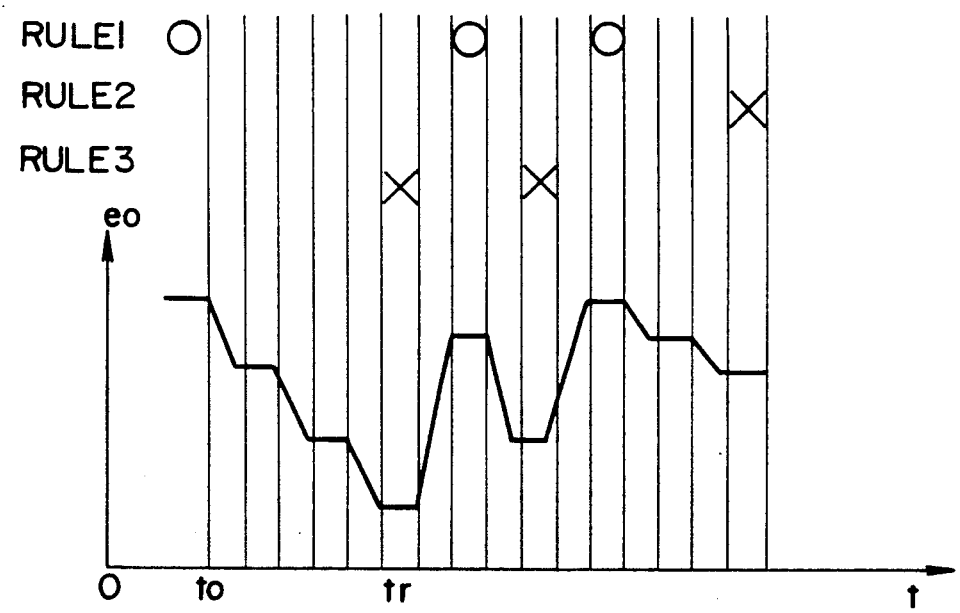
FIG. 10 shows a graph of a modified display which may be employed in the modified fuzzy inference system.

Referring to FIG. 10 there is shown an example of a little modified display from the display 70. This modified display is further connected to the output e0 of the fuzzy inference section 102, and directly connected to the dominant rule detection unit 121 to receive the dominant rule number N and to the control result evaluation unit 56 to receive the evaluated value q. Accordingly, the modified display presents a graph shown in FIG. 10 wherein an abscissa t represents time and an ordinate represents a decided value e0. In an upper section of FIG. 10 there are shown whether the dominant rules are good or bad regarding the rules 1 through 3. For example, the dominant rule at the time t0 is the rule 1 produced from the rule 1 processor 106, and the rule has a good effect to the decided value or inference value e0. The dominant rule at the time tn is the rule 3 having a bad affection or contribution to the inference value e0. The circle mark shows a good rule, and the "X" mark shows a bad rule in FIG. 10. Thus, according to this modified display, the evaluation of each rule can be found in a time sequence.

Figure 11:
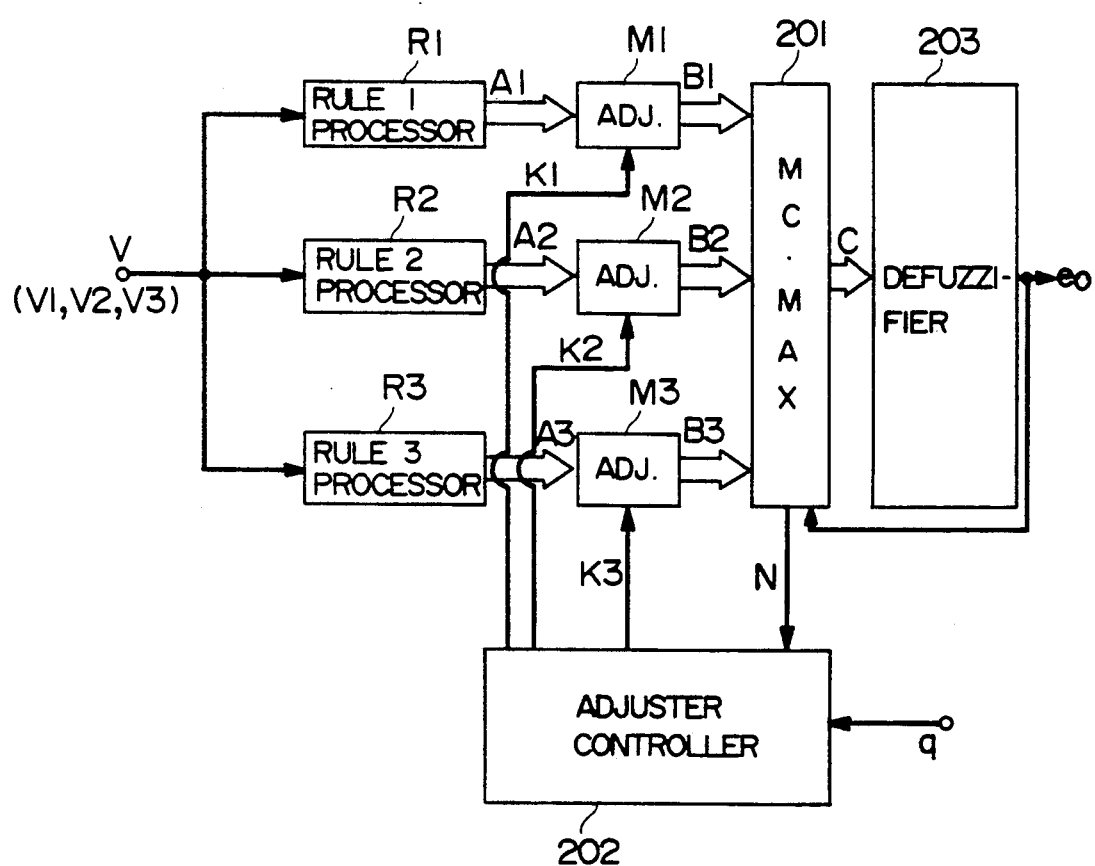
FIG. 11 is a schematic block diagram of a second embodiment of a fuzzy inference according to this invention.

Referring to FIG. 11 there is shown a fuzzy inference system having a learning means as a second embodiment of this invention. The system includes rule processors R1, R2 and R3 receiving an input signal V (V1, V2 and V3) for evaluating fuzzy rules to generate membership functions A1, A2 and A3, adjusters M1, M2 and M3 for amplifying or attenuating the membership functions A1, A2 and A3 to generate outputs B1, B2 and B3, a MC-MAX circuit 201 for MAX-synthesizing the membership functions B1, B2 and B3 and producing a dominant rule number N as described in FIG. 1, a defuzzifier 203 for generating a decided value e0, and an adjuster controller 202 for producing adjustment coefficients K1, K2 and K3 to the adjusters based on an evaluation value q about the decided value and the dominant rule number N.

Figure 12:
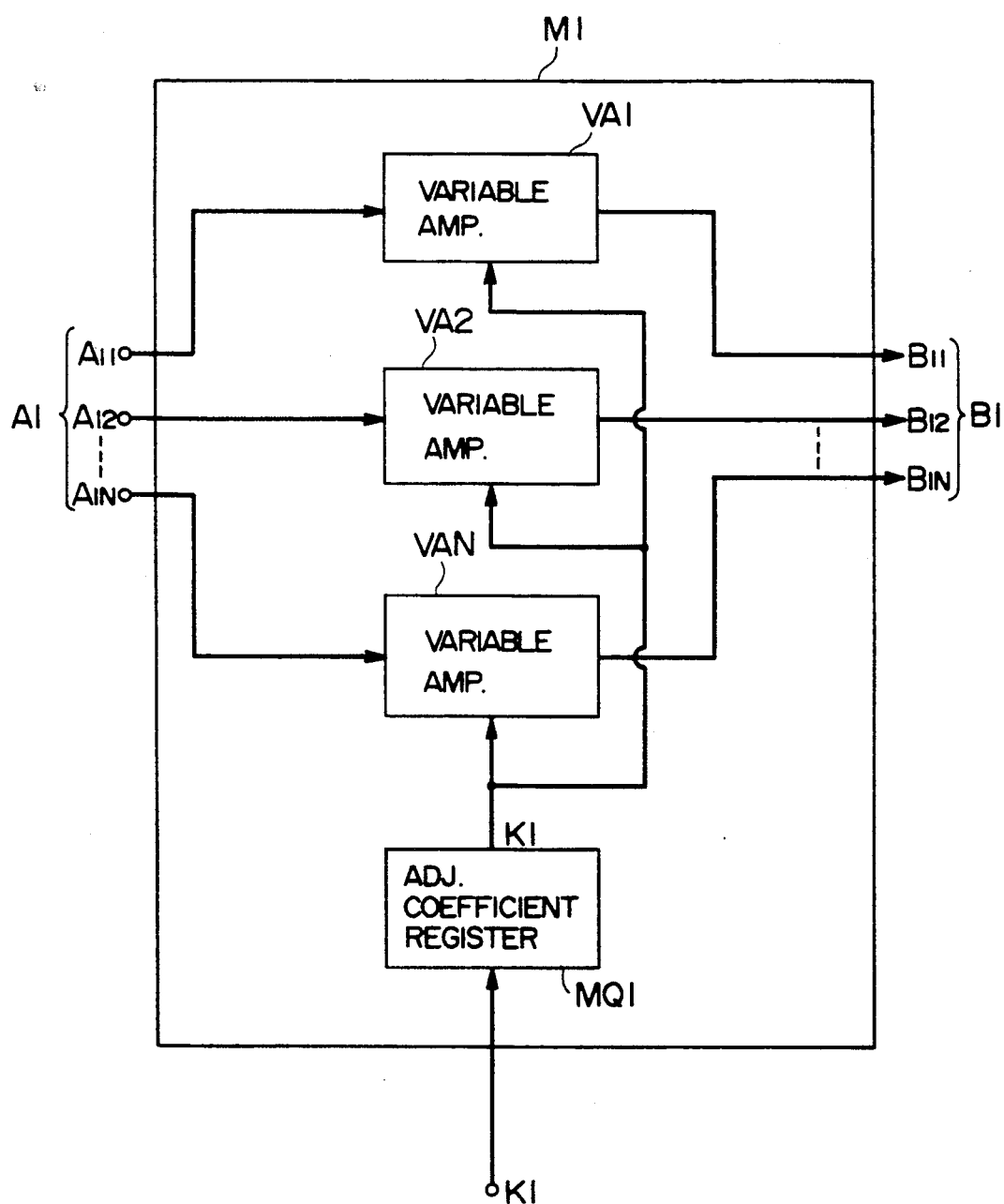
FIG. 12 is a schematic block diagram of an adjuster employed the fuzzy inference system of FIG. 11.

In FIG. 12, there is shown exemplarily a construction of the adjuster M1. Other adjusters M2 and M3 also have the same constructions. An adjustment coefficient register MQ1 stores an adjustment coefficient to provide an amplification degree K1 about the entered membership function A1. Variable amplifiers VA1, VA2, ..., VAN amplify the distributed inputs A11, A12 ..., AIN by the variable amplification degree according to the adjustment coefficient K1 given from the register MQ1. The input or membership function A1 is distributed into inputs A11, A12 ..., AIN as the functions B1, B2 and B3 in FIG. 5 are distributed. Thus, the membership function A1 is converted to the membership function B1. The functions A2 and A3 are also converted to functions B2 and B3 in the same manner. The functions B1, B2 and B3 are expressed as $$B1 = K1 \cdot A1$$

$$B2 = K2 \cdot A2$$

$$B3 = K3 \cdot A3.$$

Figure 13:
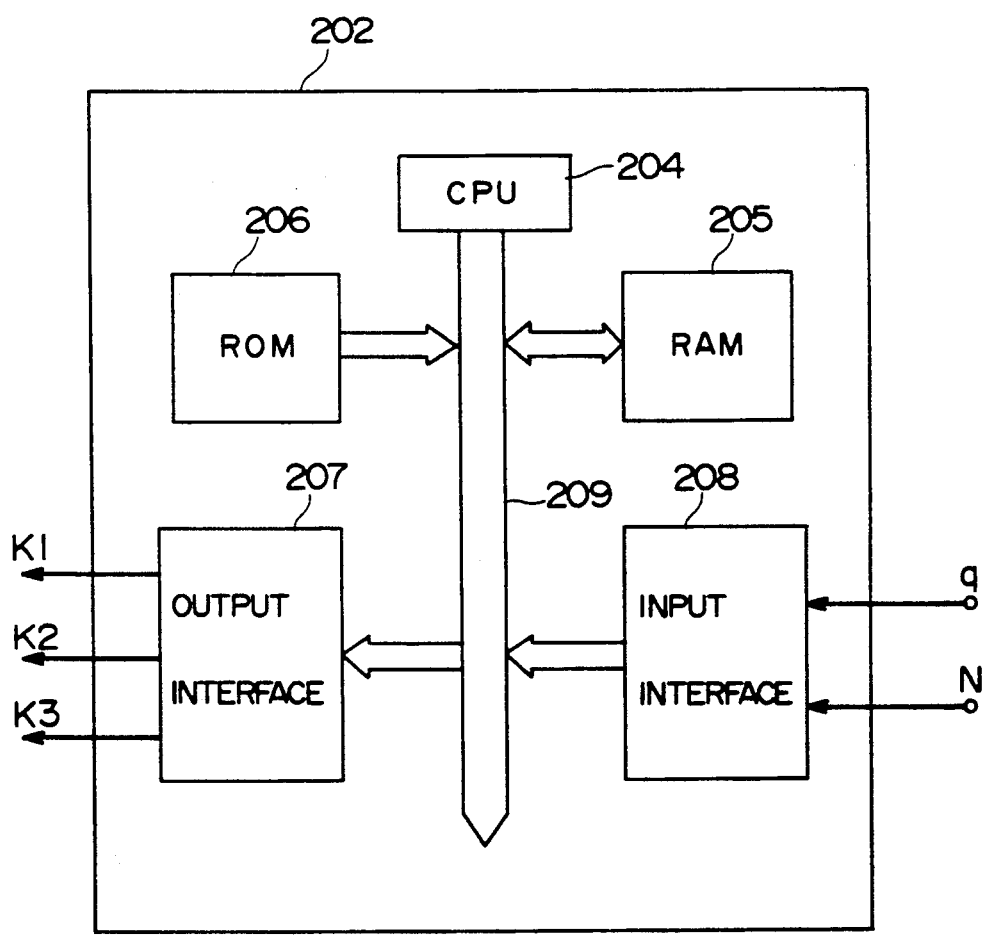
FIG. 13 is a schematic block diagram of an adjuster controller employed in the system of FIG. 11.

In FIG. 13, there is shown a construction of the adjuster controller 202 which receives an evaluation value q about the decided value e0 and the dominant rule number N from the MC-MAX 201 to produce the adjustment coefficients K1, K2 and K3 so that the evaluation of the decided value e0 can be improved. The controller 202 includes CPU 204 for controlling the process in the controller, a RAM 205 storing data for the use of working area, a RON 206 storing programs and data, an output interface 207 and an input interface 208, which are respectively connected with CPU 204 through buses 209.

Figure 14:
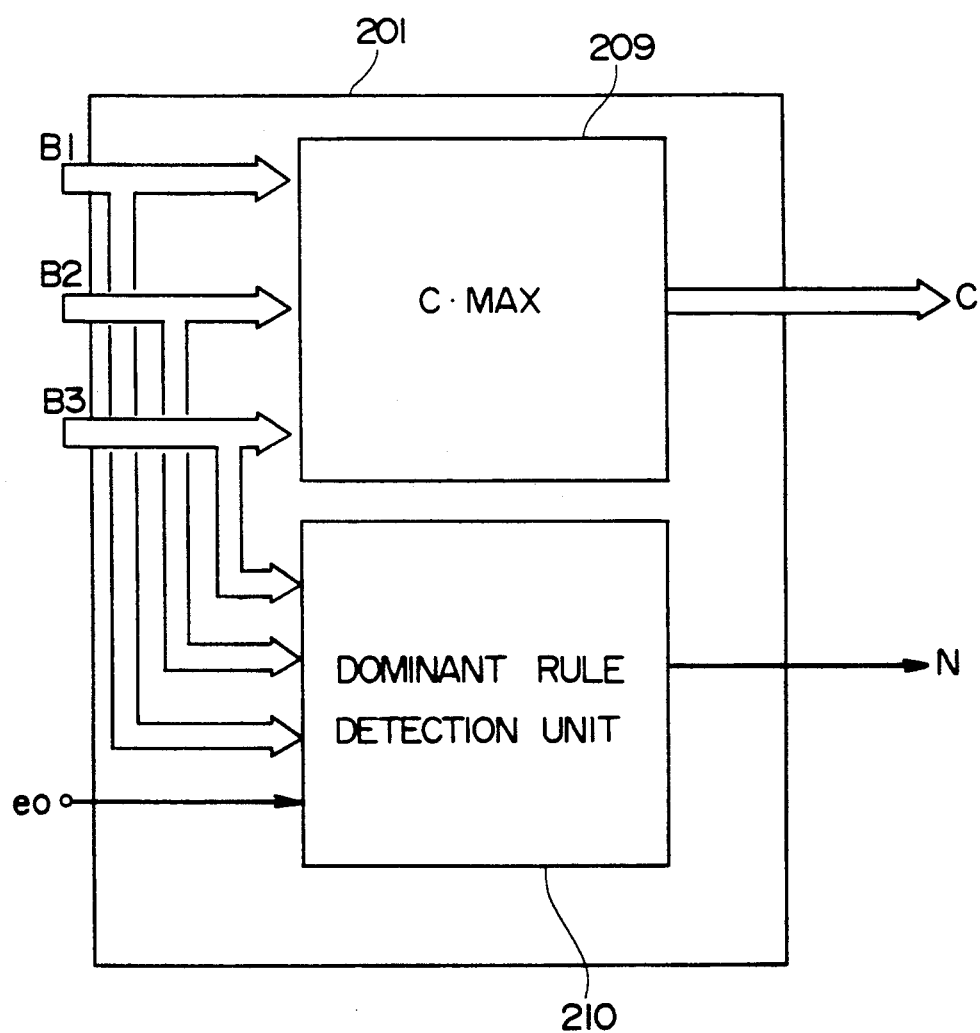
FIG. 14 is a schematic block diagram of a MC-MAX circuit employed in the system of FIG. 11.
Figure 15:
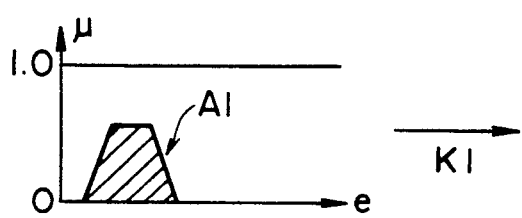
FIG. 15 illustrates an example of a fuzzy logic operation implemented in the fuzzy inference system of FIG. 11.
Figure 15:
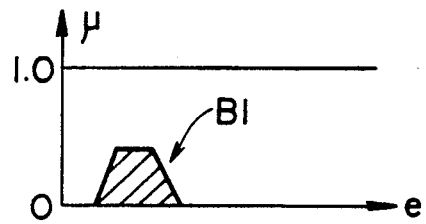
Figure 15:
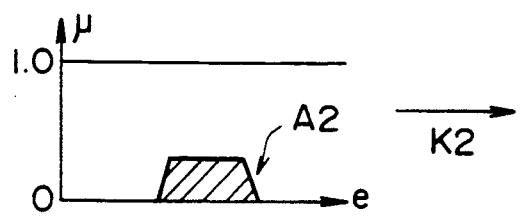
Figure 15:
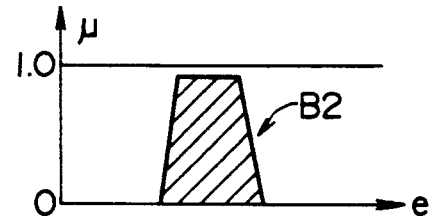
Figure 15:
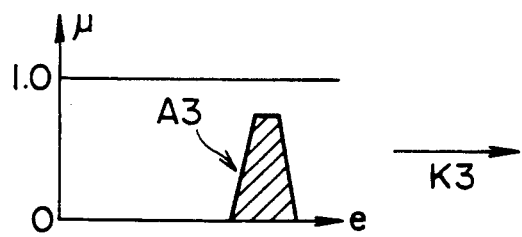
Figure 15:
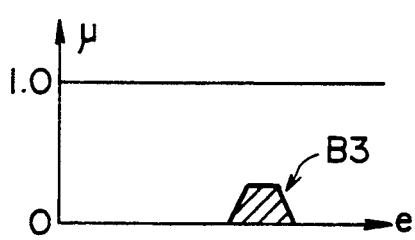
Figure 15:
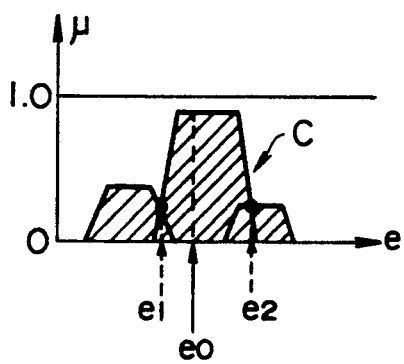

Referring to FIG. 14, there is shown the MC-MAX circuit 201 which includes a CMAX circuit 209 and a dominant rule detection unit 210. The C-MAX circuit 209 receives the membership functions B1, B2 and B3 generated from the adjusters M1, M2, and M3 to produce a membership function C which is synthesized from the functions B1, B2 and B3. The membership function C is applied to the defuzzifier 203 to produce the decided value e0. FIG. 6 illustrates the process from the entry of the membership functions A1, A2 and A3 to the production of the decided value e0. The dominant rule detection unit 210 finds the membership values (grades) of the membership functions B1, B2, and B3 at the decided value e0 fed from the defuzzifier 203 to the unit 210, and produces the dominant rule number N of the fuzzy rule corresponding to the membership function providing the largest membership value among the functions B1, B2 and B3. Thus produced dominant rule number N is applied to the adjuster controller 202. Since the unit 210 has the same construction and function as those of the dominant rule detection unit 21 in the first embodiment, its detailed explanation is omitted for simplicity.

The adjuster controller 202 receives the dominant rule number N and the evaluation value q such as a deviation as described about the code q in FIG. 8. Assuming that the value e0 expresses "good" when q=1 and "bad" when q=0, the adjustment coefficients K1, K2 and K3 produced from the controller 202 are expressed by the following logic:

```
(1) if q = 1 and N = 1,
    K1 = Min (Max K, K1 + ΔA)
    K2 = Max (Min K, K2 − ΔA)
    K3 = Max (Min K, K3 + ΔA)
(2) if q = 1 and N = 2,
    K1 = Max (Min K, K1 − Δ)
    K2 = Min (Max K, K2 + Δ)
    K3 = Max (Min K, K3 − Δ)
```

-continued (3) if q = 1 and N = 3,
  K1 = Max (Min K, K1 − Δ)
  K2 = Max (Min K, K2 − Δ)
  K3 = Min (Max K, K3 + Δ)
(4) if q = 0 and N = 1,
  K1 = Min (Max K, K1 − Δ)
(5) If q = 0 and N = 2,
  K2 = Min (Max K, K2 − Δ)
(6) if q = 0 and N = 3,
  K3 = Min (Max K, K3 − Δ)

wherein Max K > Min K, Max K >> Δ, Min K = 0. According to this logic, the output of the dominant rule providing a good result is amplified by a high amplification degree, but the output of the dominant rule providing a bad result is amplified by a low amplification degree. Thus, according to this embodiment, the weight of the fuzzy rule providing large effect to the production of the decided value is changed in accordance with the evaluation about the decided value obtained by the fuzzy inference, so that the process of the fuzzy inference can be adjusted to the best results.

Though three fuzzy rules are employed in the above-described embodiments, a larger or smaller number of fuzzy rules may be employed in the fuzzy inference systems if desired.

What is claimed is:

1. A fuzzy inference system, comprising:
   (a) rule processing means for receiving an input signal and for generating first data in accordance with a plurality of fuzzy rules, said rule processing means comprising:
     at least one rule processor for applying said fuzzy rules and for generating a plurality of second data;
   (b) defuzzifying means for receiving said first data and for generating a decided value;
   (c) dominant rule number means for receiving said plurality of second data and said decided value and for finding a dominant rule of said plurality of fuzzy rules which has the largest contribution to said decided value; and
   an actuator for receiving said decided value from said defuzzifying means and for controlling an external object in accordance with said decided value.

2. A fuzzy inference system according to claim 1, wherein said rule processing means comprises a plurality of rule processors corresponding to said plurality of fuzzy rules, said second data being membership functions respectively generated from said rule processors, and said dominant rule has the maximum membership function value corresponding to said decided value.

3. A fuzzy inference system according to claim 2, further comprising adjusting means connected between said rule processors and compounding means for adjusting the relationship between the membership functions of said dominant rule and other rules.

4. A fuzzy inference system according to claim 3, wherein said adjusting means includes adjusters (M1, M2, M3) interposed between said rule processors and said defuzzify means.

5. A fuzzy inference system according to claim 1, wherein said rule processing means includes means for storing a plurality of suggested values for each of said fuzzy rules.

6. A fuzzy inference system according to claim 5, further comprising dominant proposition means connected to said rule processing means and said dominant rule number means for evaluating values of said suggested values in said found dominant rule and said second data in accordance with said dominant rule to find a dominant proposition.

7. A fuzzy inference system according to claim 6, further comprising output means connected to said dominant proposition means and said dominant rule number means for producing third data representing said dominant rule and its dominant proposition.

8. A fuzzy inference system according to claim 1, further comprising status evaluating means for evaluating a status of an external object, means connected to said status evaluating means for controlling said external object in accordance with said decided value, and rule evaluating means for evaluating each dominant rule found by said dominant rule number means on the basis of the result of evaluation by said status evaluating means to generate an evaluation value of each dominant rule.

9. A fuzzy inference system according to claim 8, wherein said rule evaluating means includes a plurality of counters corresponding to said plurality of fuzzy rules to evaluate a rule designated by said dominant rule number means and generate respective evaluation values of said plurality of fuzzy rules.

10. A fuzzy inference system according to claim 8, further comprising display means for displaying said decided value and an evaluation of said dominant rule as time elapses.

* * * * *